(12) United States Patent
Barillaud

(10) Patent No.: US 6,578,021 B1
(45) Date of Patent: Jun. 10, 2003

(54) METHOD AND SYSTEM FOR CLASSIFYING NETWORK DEVICES IN VIRTUAL LANS

(75) Inventor: Franck Barillaud, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/412,686

(22) Filed: Oct. 5, 1999

(30) Foreign Application Priority Data

Dec. 29, 1998 (EP) ............................................. 98480101

(51) Int. Cl.[7] ............................. G06E 1/00; G06E 3/00; G06F 15/18; G06G 7/00
(52) U.S. Cl. ......................................................... 706/20
(58) Field of Search ............................. 706/20, 21, 26

(56) References Cited

U.S. PATENT DOCUMENTS 5,373,486 A * 12/1994 Dowla et al. ................ 367/135
6,085,238 A * 7/2000 Yuasa et al. ................. 709/223

OTHER PUBLICATIONS

Kishan Mehrotra et al; Artificial Neural Networks; 1997; Massachusetts Institute of Technology; 1, 25, 180,181, 187, 188, 189.*

B. S. Rawat et al; A New Neural Network Approach for Virtual Topology Design fo Multihop Optical Networks; Jun. 18, 1998; The Institute of electrical engineers; 3/1–3/6.*

* cited by examiner

Primary Examiner—John Follansbee
Assistant Examiner—Joseph P. Hirl
(74) Attorney, Agent, or Firm—George E. Grosser; John D. Flynn

(57) ABSTRACT

Network management information stored by network devices in a switched network is obtained at a network management workstation. This is information that relates to the activity of the network devices on the network, such as the logical address of the network devices in communication with other devices. For TCP/IP networks utilizing the NMP protocol, this information is stored in the MIB or the RMON matrix group variables. This information feeds a neural network. The output of the neural network is a list of network devices grouped in virtual LANs (VLANs) such that network devices communicating, or having recently communicated, are grouped in the same VLAN. The network management information is periodically updated so the VLAN grouping can also be periodically refreshed to reflect current network device activity and thus optimize the network bandwidth.

26 Claims, 16 Drawing Sheets

METHOD AND SYSTEM FOR CLASSIFYING NETWORK DEVICES IN VIRTUAL LANS

TECHNICAL FIELD

This invention relates to network administration applications and more particularly to applications allowing administration of switched LANs (Local Area Networks) organized in Virtual LANs.

BACKGROUND ART

Bridged and router based LAN networks are migrating to switched LAN networks. With the increasing size of networks and the type of traffic in the LANs which is rather broadcast than unicast, it appears that the traditional LAN is not sufficient. The LAN protocol such as Ethernet and Token Ring is responsible for regulating the traffic within the communication channel so that only one device can make use of the communication channel to send data at one time. From one other point, the operations a router has to perform for each packet are the following: look up the (OSI) Layer 3 address in its tables and determine the outbound port, update the layer 3 header (for example, to decrement the hop count) and strip and replace the Layer 2 header. Furthermore in the routers these operations are implemented in software. These operations have to be done by all the routers in the path between two end stations that want to communicate; the more routers, the more work. On the contrary, switching technology is faster, easier and cheaper; it rather relies on hardware implementations which improve costs and performance. A LAN switch, like a multiple port bridge, learns all the MAC addresses in the segments to which its ports attach and bridges the traffic between its ports.

A second advantage of the switched LAN network is the possibility of building VLANs or logical subsets of a physical network or networks. A VLAN is a LAN which maps workstations on some other basis than the geographic location: the workstations may be grouped for example, by department, type of user or primary application. The grouping into broadcast domains, was previously done in hubs and routers at layer 3; unfortunately, if the address of the device changed (for example, due to a move of the physical workstation), an administrator had to go to the device and assign a new network address. With VLANs, the grouping is independent of the physical location. A VLAN could be based on physical address location, MAC address, network address or some other defining characteristics such as the protocol. A standardization of the VLAN for legacy LANs is in process under the reference IEEE 802.1Q. As with the VLANs the traffic is directed to only those users that need it, the bandwidth usage is improved and thus, the performance of the network is improved. One other advantage of the VLANs is to be able to build scalable switched networks: the hierarchical deployment of switched networks will help in deployment of large switched networks. Finally, one major advantage of the VLANs is to avoid manual reconfiguration of the hubs when endstations are moved/added: whatever will be the new physical address of the user, it will still keep its grouping in LAN. For instance with IP networks, the IP addresses are conserved when the stations are moved.

The network administrator in charge of the VLAN configuration defines the initial configuration and can change or add workstations and manage load balancing and bandwidth allocation more adequately than with the LANs. Network management software keeps track of relating the virtual picture of the local area network with the actual physical picture. This operation of defining the VLAN configurations is performed from the network management station by entering through the user interface, commands for the switching devices connecting the workstations over the network. VLAN manager programs such as ClearVISN VLAN Manager of COMPAQ is a graphical SNMP (Simple Network Management Protocol) application that enables network managers to configure and manage VLANs graphically. This program particularly helps in configuring port-defined VLANs and manage moves, adds and changes through graphical software. Whatever the tools used to configure the VLANs in the switching devices, the VLAN administrator always has to classify the network workstations by VLANs.

A first problem with VLAN classification is the time consumed by the network administrator to group network devices by VLAN on the basis of the criterion chosen for classification. Without any method this is time consuming and subject to errors. While vendors have promoted the simplicity of Virtual LANs, a reason they are not popular today, given the perceived benefits, is the manual operations usually required for the initial setup, especially if the network to be configured contains several thousand nodes.

A second problem to classify workstation by VLANs is the choice of the criterion. Classification can be port based: it is the simplest form of VLANs which is just a collection of different ports in a LAN switch or number of switches. But it cannot address the problem of adding devices or changing physical location of device in the network. There are also MAC address based VLANs: in each VLAN there is a list of MAC addresses. This model can track network devices automatically when they change their location. However it may not be so easy to manage a large number of MAC addresses. It is also possible to build a VLAN based on workstation IP subnet address, the IPX subnet address and so on . . . . It gives much flexibility to the network administrator and is easier to manage than the MAC addresses based VLANs. However, the most flexible VLAN implementation is the policy based VLAN which can include all the ways mentioned above of defining a VLAN and it is possible to select a method suitable for a particular network. These policy based methods are mostly used today to obtain the best optimization of the bandwidth. The difficulty to establish a good criterion to classify VLANs is to extract useful patterns from voluminous amount of data.

SUMMARY OF THE INVENTION

It is therefore an object of the present invention to provide an automatic method for VLAN classification.

A further object of the present invention is to provide an automatic VLAN classification which optimizes the bandwidth use while taking into account the evolution of the traffic changes in the network.

These objects are achieved by a method for classifying network devices in VLANs in a switched network having a network management application managing said network devices, said method being characterized in that it comprises the steps of:

collecting network management variables stored on said network devices using said network management application;

feeding a Neural Network operating on a computer with said network management variables reflecting the activity of said network devices, and running said neural network, said neural network providing an output list of network devices grouped in VLANs according to the value of the network management variables.

By using the network elements (physical devices or applications running on such devices) addresses communicating together and forming VLANs on the basis of this criterion, the network administrator will be sure that the broadcast domain formed per VLAN, will optimize the use of network bandwidth; but the major interest of the solution is the use of a neural network able to automatically classify and also the fact of obtaining this information, which is stored in the ARP tables of the switches, in a network management variable stored by the network devices: this classification can be done automatically and periodically refreshed because the network devices maintain the information up to date. The application automatically provides a VLAN list to the administrator who can then update the VLAN definitions in the switches of the network; furthermore, using the classifier of the invention, one can easily add to this application after classification steps an automatic update of switches in the network with the VLAN definition via the network management protocol facilities.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF THE PREFERRED EMBODIMENT

Figure 1:
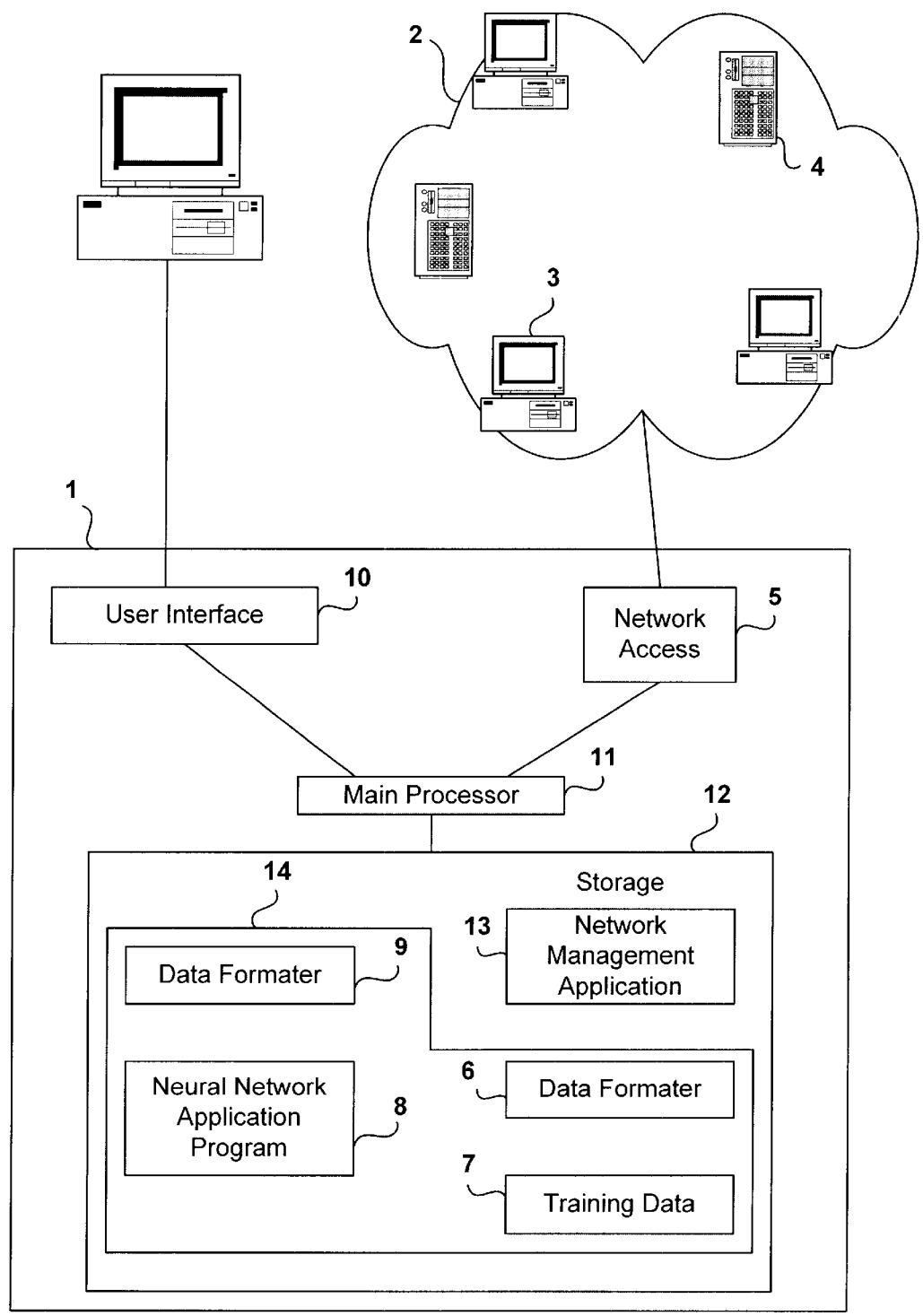
FIG. 1 shows an overview of the architecture of the system of the invention including the software components of the VLAN classifier application of the invention.

Referring to FIG. 1 and according to the preferred embodiment of the present invention, there is shown an architecture of an Automatic Network Device Classifier system assigning a Virtual LAN membership to devices of TCP/IP networks. It comprises a TCP/IP network (2) having network devices (3, 4) having either logical or physical connection between each of them. A computer system (1) is connected to the network via a network access component (5) which may be, for instance, a Token Ring card for connection to Token Ring devices.

The computer system comprises a main processor (11) having access to a storage unit (12) which maybe primary, such as a RAM unit, or secondary, such as a magnetic or storage unit. The computer system also comprises a user interface (10) allowing users to communicate with the computer system using, as an example, a workstation comprising a terminal with a keyboard and a screen. The computer storage comprises the data and executable programs allowing classification of the network devices into VLANs.

Input data is collected by the computer system through the network access from the network devices which maintain variable data when managed by a network management application. A network management application (13) stored in the computer storage uses in the preferred embodiment the SNMP (Simple Network Management Protocol) protocol to communicate with the network devices. The network devices store all the variables defined in their Management Information Base (MIB). The input data stored by the managed network devices is collected and stored in the Address Resolution Protocol table in the intermediate devices when communication is established between two users. The collected information forms a historical repository; as a matter of fact, this information can be reused when the communication is re-established between two users to accelerate the process.

Once the input data are collected they are entered for processing in the VLAN classifier application (14) stored in the system computer storage (12). In the preferred embodiment, the user can always start and stop the VLAN classifier application and activate independently each component (6, 7, 8, 9 ) of the classifier (14) through the user interface: preferably, the VLAN classifier application is installed on the network management workstation which has the network access (5) to the network and a user interface (10). One other solution is to have a the VLAN classifier application components (6, 7, 8, 9) installed and run on an independent computer. This VLAN classifier application may be run interactively through a user interface or may be run automatically without any user interactive participation. The input data is formatted by an input data formatter software component (6) of the classifier application. Once formatted the input data are stored as training data and provided as input for training of a neural network application program (8) stored in the system computer storage.

The neural network used is an Artificial Neural Network (ANN) The advantage of using an ANN is triple: firstly, an ANN is excellent to generalize problems. This contrasts with conventional algorithms which often need to be tested with all possible combinations of input data. This is unfeasible for complex problems. Secondly, ANN are trained rather than explicitly programmed. This means that in many areas, where the problem is too complex to provide a comprehensive theory, an ANN may still be able to solve new problems if is shown a sufficient number of data. No expert is needed to provide rules which often turn out to be incorrect or incomplete. Feature-extraction Neural Networks may find patterns and features without any supervision. Thirdly, an ANN can be designed to operate as a function of approximation, specially in cases where the function is so complex that one has not been able to find a sufficient simple but accurate approximation by conventional mathematical methods.

More particularly, the ANN is a Self-Organizing Feature Map (SOFM) Artificial Neural Network that develops a probability density map of the input vector space to perform topological mapping to accomplish the classification task. One other ANN could also be an Adaptive Resonance Theory (ART) neural network. Coming back to FIG. 1, if the neural network has been already taught, it is directly fed with formatted input data and run.

The result of the classifying application is a data set which is then formatted by the output data formatter (9) which is stored in the storage of the computer system and activated upon reception of the output data from the neural network application program (8). The user, through the user interface, accesses the output data which provides a list of the network devices per VLAN. The network administrator will use this list to define the VLANs in the switching devices of the network. The result of this classification provides policy based VLANs for which the classification criterion reflects the real activity of the different users. All the network users working together will be grouped in the same VLAN. This means that the per VLAN organization of the switched network will allow optimization of network bandwidth. Furthermore, the information taken as input to the neural network classifier is 'aged'. That means that during a certain period of time when there is no communication between two users the information is removed from the storage of the network device. To be kept up-to-date, the automatic VLAN classification should be periodically repeated and the new VLANs consequently redefined, in order to reflect the real activity between the network devices. This will give to the administrator of the network an assurance of optimum usage of the bandwidth in the switched network.

Figure 2:
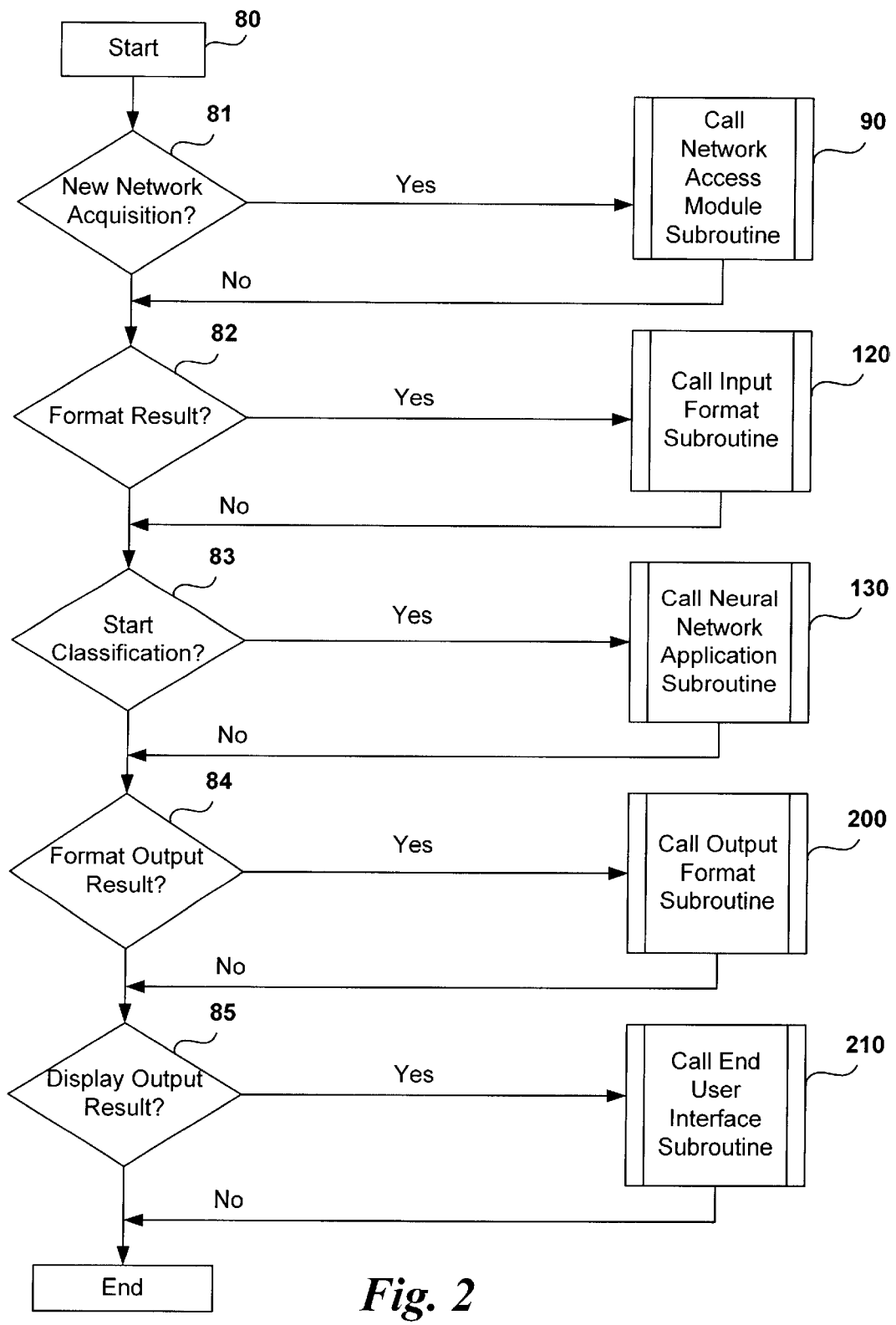
FIG. 2 shows the general flow chart of the VLAN classifier application of the invention.

FIG. 2 is the general flow chart of the preferred embodiment of the present invention comprising logical blocks executed on the main processor (11) of the computer system (1) implemented as a main program and subroutines for classifying the assignment of Virtual LANs of TCP/IP network devices from a workstation interfacing the computer system through a user interface (1). It is noted that in this embodiment each operation is started after questioning the user through the user interface. This general flowchart identifies the operations necessary to use a Neural Network which comprise collecting of data, formatting of data, running of the neural network for training, running of the neural network and formatting of output data. In the preferred embodiment the user of the classifier can skip or request (tests 81, 82, 83, 84, 85) the execution of the main steps of the method by using the user interface. When the program starts (80), a test is performed to know if a new network data acquisition (81) is requested; if the answer is Yes, a subroutine (90, described in FIGS. 13, 14, 15, 16, 17), the Network Access Module, collects the Neural Network input data from the network devices. In the preferred embodiment the Network Access Module is done through shell scripts of SNMP commands. The input data are the MIB variable values collected in the MIB of the devices. After new network data acquisition is performed or if a new network data acquisition is not requested, a test (82) is performed to know if already existing input data are to be formatted. If so, the input format subroutine is called (120 described in FIG. 19). After the input data have been formatted or if the input data have no need to be formatted, a test is performed to check if the classifying of data is requested (Yes to test 83), the classification is started (Neural Network Application subroutine 130 described in FIGS. 3, 4, 5, 6, 7, 8, 9). This classification includes the step of running a Neural Network after having trained it if not already done. Then, if the output result of the just performed, or previously performed classification is data which need to be formatted (Yes to test 84), the Output Format subroutine is called (200 described in FIG. 20). In the preferred embodiment, the output result may also be displayed if requested (test 85) by calling the End User Interface subroutine (210 described in FIG. 21).

Figure 3:
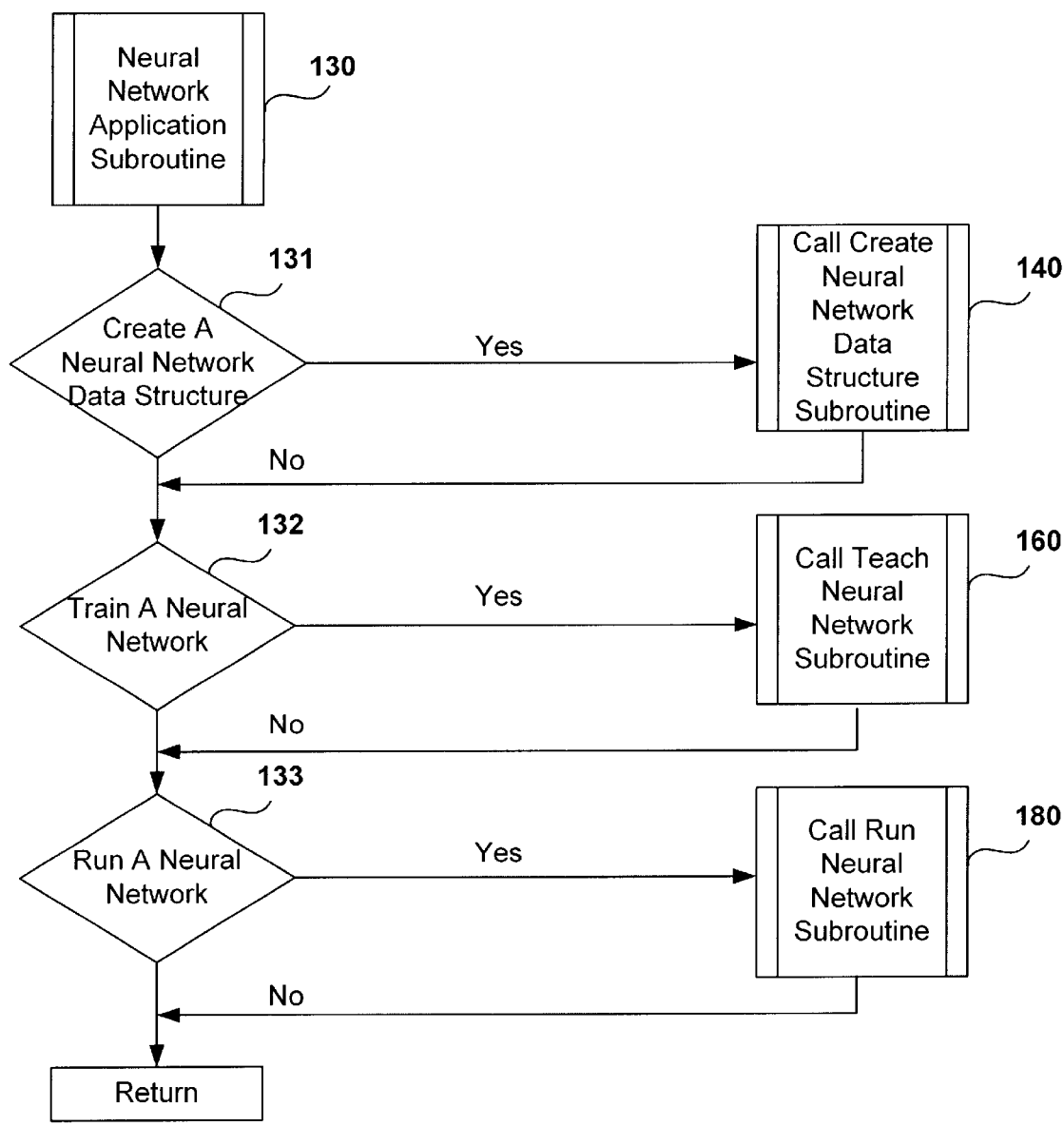
FIG. 3 is the general flow chart for the Neural Network Application Subroutine.

FIG. 3 shows a flow chart for the Neural Network Application subroutine (130) referred in the general flow chart of FIG. 2. A first test is performed (131) to check if it is needed to create a neural network data structure. When first used, the neural network usually needs to build a data structure. This is performed by activating the neural network data structure subroutine (140 described in FIG. 4). Creating a neural network data structure is a usual step when using a neural network in an application for the first time. Then, the user is asked wether there is a requirement for training the neural network (132). If the user answers yes, the Teach neural network subroutine (160 described in FIG. 6 and 7) is activated. The training of a neural network is a usual step when using a neural network in an application for the first time. The next step is a test (133) using the user interface to check if the neural network is to be run. If the answer is yes, the run neural network subroutine is started (180 as described in FIGS. 8 and 9). If the answer is no or if the run neural network subroutine has been executed, the neural network application subroutine ends. Control is provided to the main application illustrated by the flow chart of FIG. 2.

Figure 4:
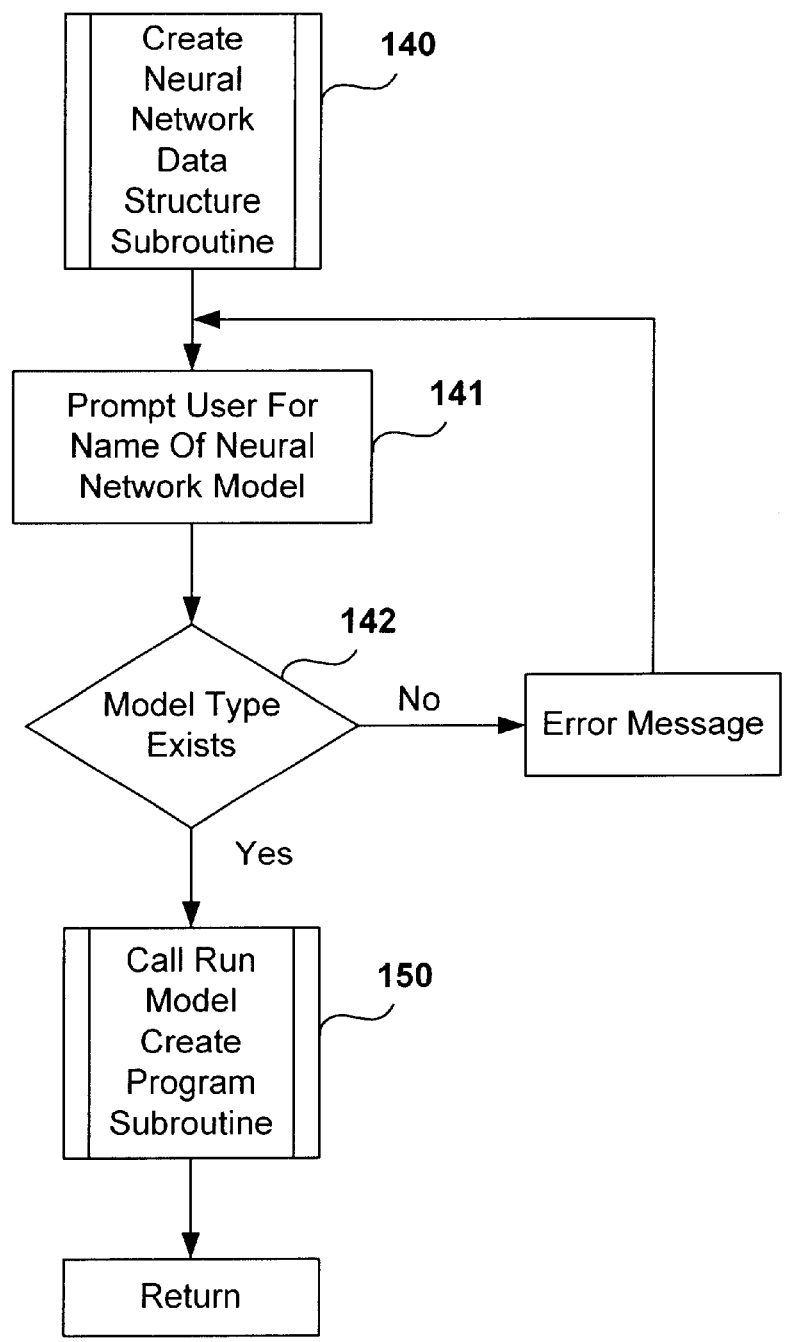
FIG. 4 shows the Create Neural Network Data Structure subroutine flow chart

FIG. 4 illustrates the create neural network data structure subroutine (140). This routine, called during the execution Neural network application subroutine (130) of FIG. 3, is for creating a new model of the neural network. The user is prompted to provide the name of the new model (141). The new model name is read and checked against existing model names stored in the storage of the computer system (1) and, if the model does not exist (result no to test 142), the run model create program subroutine (150 described in FIG. 5) is called. An error message is displayed at the user workstation if the new model name entered by the user is an existing model name. The subroutine ends and control is given back to the calling subroutine once the run model create program subroutine (150) is completed.

Figure 5:
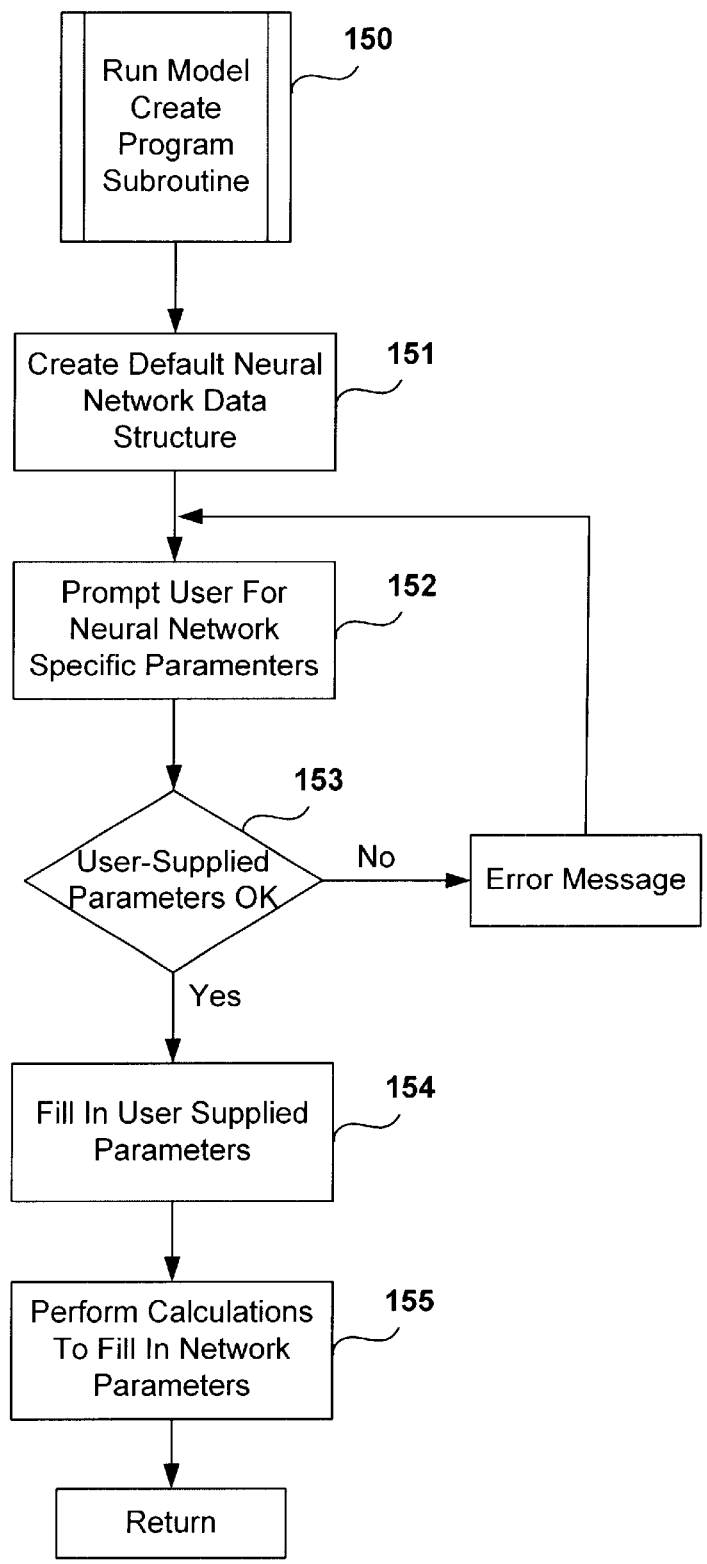
FIG. 5 Shows the Run Model Create Program subroutine flow chart

FIG. 5 describes in a flow chart the steps of the run model create program subroutine (150) of FIG. 4. This subroutine is called when a request is raised to create a new model for the neural network. This is a usual operation for neural networks when they are used for the first time. The subroutine first creates a default neural network structure (151) and prompts the user for specific parameters characterizing the neural network model to be activated for the VLAN classifier application. Particularly these parameters can indicate an SOFM or an ART Artificial neural network. If the user supplied parameters are in error the prompting is repeated. If the parameters supplied are correct (result 'yes' in test 153), the user parameters are set (154) and processed to load the neural network with them (154).

Figure 6:
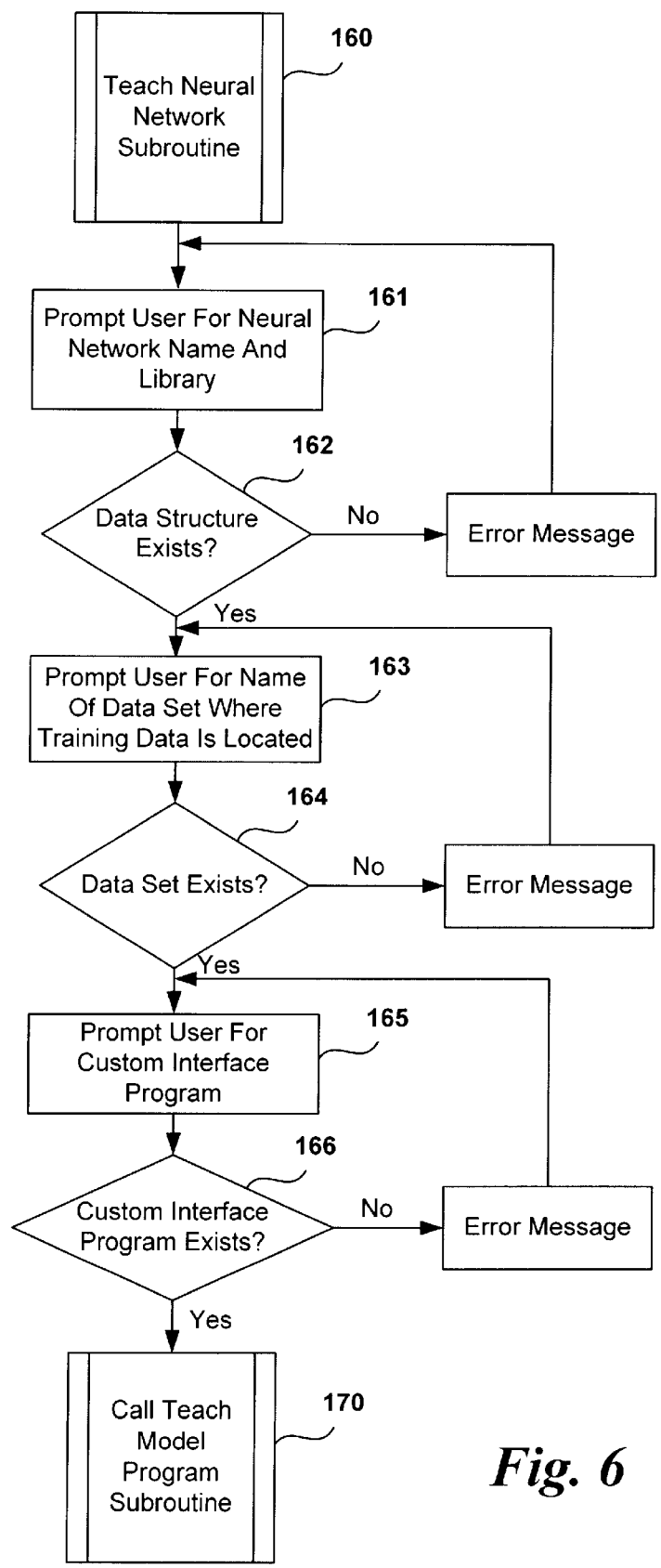
FIG. 6 is the general flow chart for the Teach Neural Network subroutine

FIG. 6 shows the flow chart of the Teach Neural Network subroutine (160) which is called, as illustrated in FIG. 3, each time a request is raised for teaching the neural network. More particularly FIG. 6 illustrates the preliminary phase of teaching, which is retrieving of the Neural Network structure (161, 162) and retrieving of training data thru a dialog with the user (163, 164). Training data for the Neural Network are initial data collected from the network and which have been previously formatted. Once training data is validated, the user is then prompted to enter a custom interface program (165). This specific interface is used by the neural network to access the data provided as input: it depends on the type of neural network and is mandatory. If there is no such custome interface program corresponding to the neural network determined in the previous step, the user is prompted with an error message (166) and is re-asked to enter a new custom interface program. If the result of test (166) is 'yes', the Run Teach Model Program subroutine is called (170).

Figure 7:
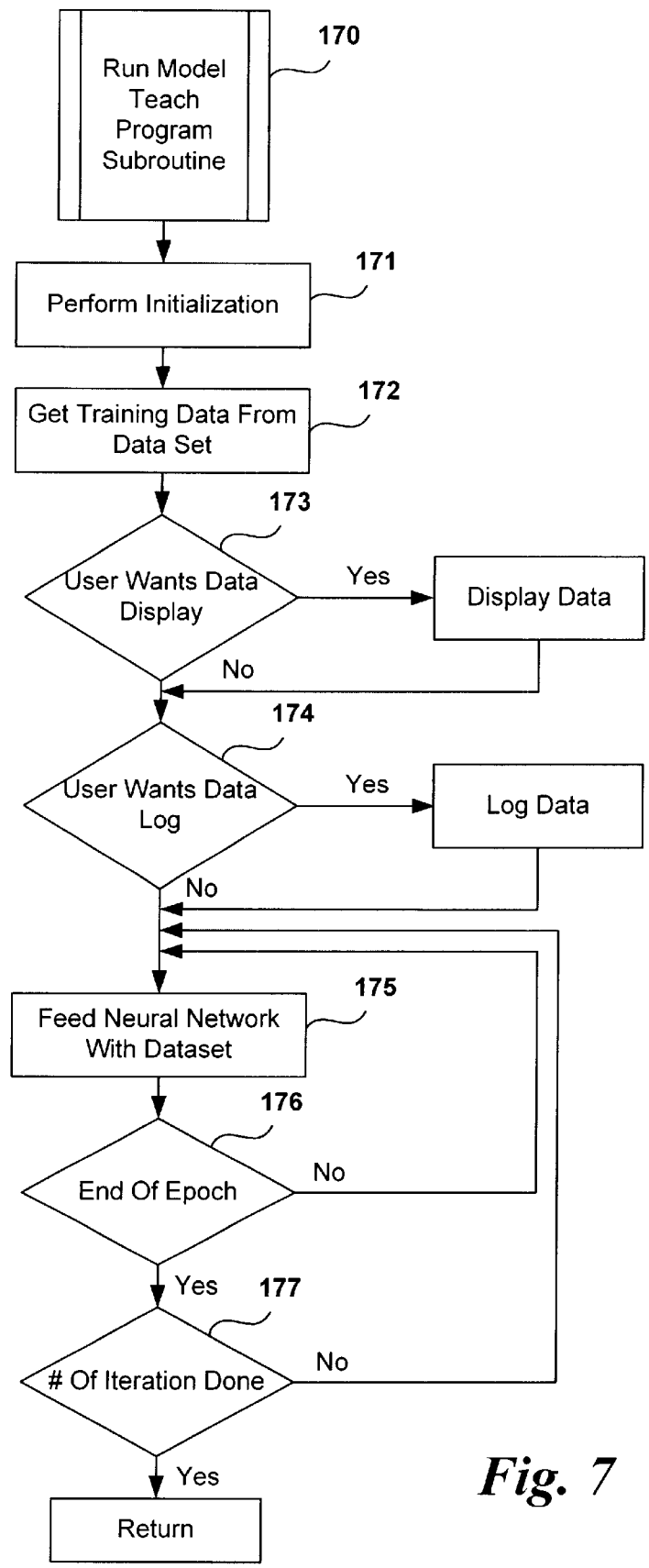
FIG. 7 is the general flow chart for the Run Model Teach Program subroutine.

FIG. 7 is the flow chart of the Run Teach Model Program subroutine (170) called by the Teach Neural Network subroutine (160) as illustrated in FIG. 6. The first step is for initializing the neural network model (171); once done, training data is obtained (172) from data set according to the information entered by the user. Then the user is asked if he wants the training data to be displayed (173) or logged (174). If the user wants the data to be logged a default file name is provided to the file where the data will be logged. The neural network is then fed (175) with data coming from the data set. The input data is tested to check if it is the last epoch for the neural network, the epoch being the input vector provided to a neural network. In the case of feeding the NN with the IP address of the devices, there is a one dimension vector. If not the last epoch, the neural network is fed with the next record read from the data set. If all the data are read, the number of iterations already performed on the reading of the data set is checked (177) against a predetermined iteration number. This number is one of the parameters provided for the initialization of some kinds of NN. This indicates that the NN should stop before convergence after a defined number of iterations. If the number of iterations is reached, the subroutine returns. If not, feeding of the neural network with the data set (175) restarts.

Figure 8:
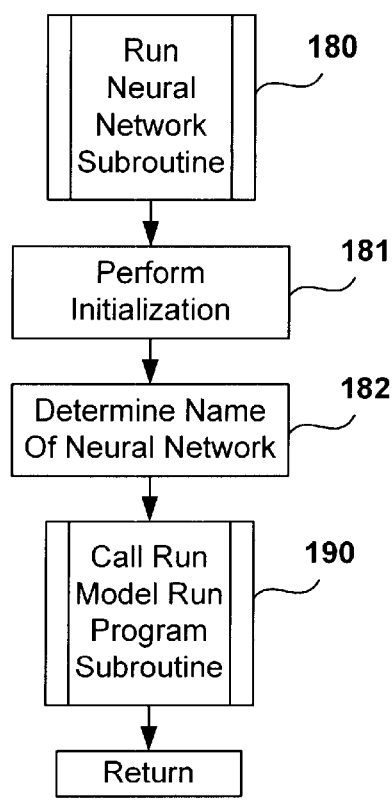
FIG. 8 is the general flow chart for the Run Neural Network subroutine.
Figure 9:
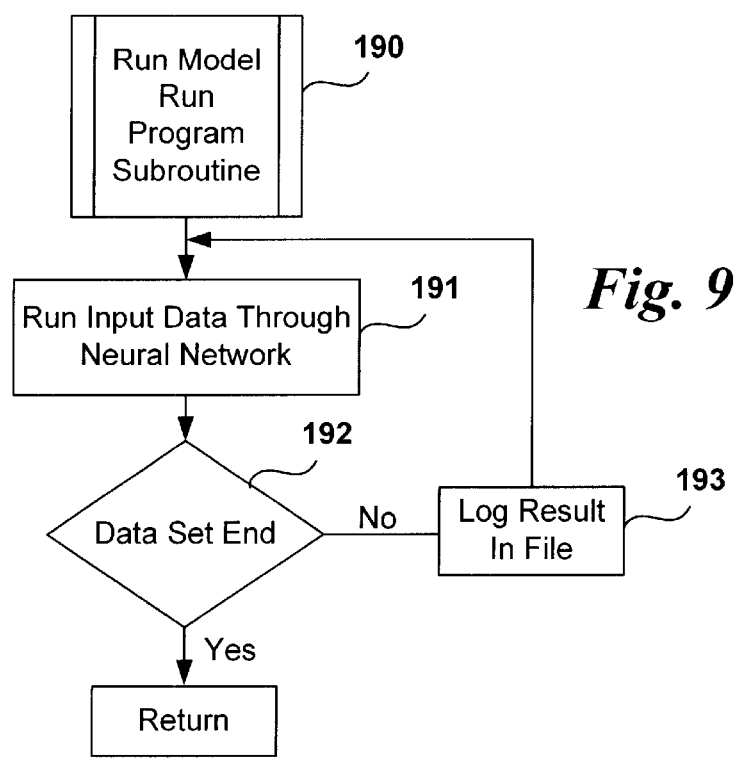
FIG. 9 is the general flow chart for the Run Model Run Program subroutine.

FIGS. 8 and 9 is the flow chart of the Run Neural Network subroutine (180), one other subroutine of the Neural Network Application subroutine (130) called during the classification (FIG. 3) in the general flow chart (FIG. 2). During the process of classification, this routine is called once the neural network has been already been trained. It consists firstly in an initialization (181) of the neural network model on the basis of parameters entered during the Run Model Create subroutine execution (step 154) corresponding to the model; then the name of the of the neural network is determined (182); then the formatted input data is sent to the determined neural network which has been previously trained (FIG. 7). Each input data set is read and processed by the neural network and has a log result filed (193) in a log file. Log data resulting from processing of the neural network is stored in raw mode without any additional information. This operation is repeated until the formatted input data has been entirely read: when the answer to the 'data set end?' test (192) is yes.

Figure 10:
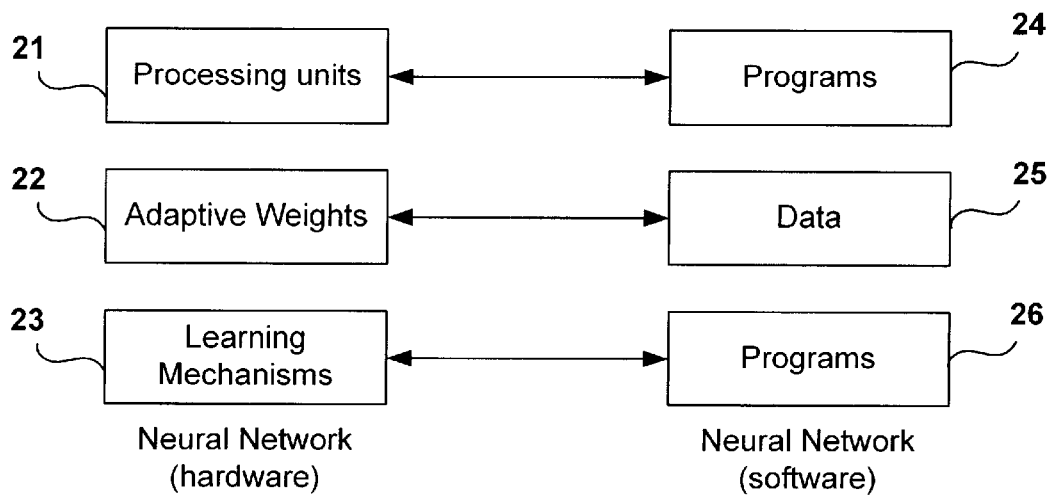
FIG. 10 illustrates the Neural Network implementation in software

As shown in FIG. 1 the environment for operating the classifier is quite simple. More particularly, FIG. 10 illustrates how it is possible to simulate hardware neural network (parallel) computers on a Von Neumann (serial) processor system. There are many different neural network models with different connection topologies and different processing unit attributes. However, there can be described as computing systems which are made of many (tens, hundreds, thousands) simple processing units (21) connected by adaptive weights (22). It is known that weights are used to qualify the degree of importance applied to communications of nodes inside a neural network. The weights are modified while the neural network is taught. In addition, to processors and weights, a neural network model must have a learning mechanism (23) which operates by updating weights after each training iterations. The weights represents the output of the activation function before the processing units. A hardware neural network model can be simulated on digital computer by programs and data. Programs (24) simulate the processing functions performed by neural network processing units (21); adaptive connection weights are stored as data (25). Programs (26) are used also to implement the learning or connection weight adaptation mechanism (23).

Figure 11:
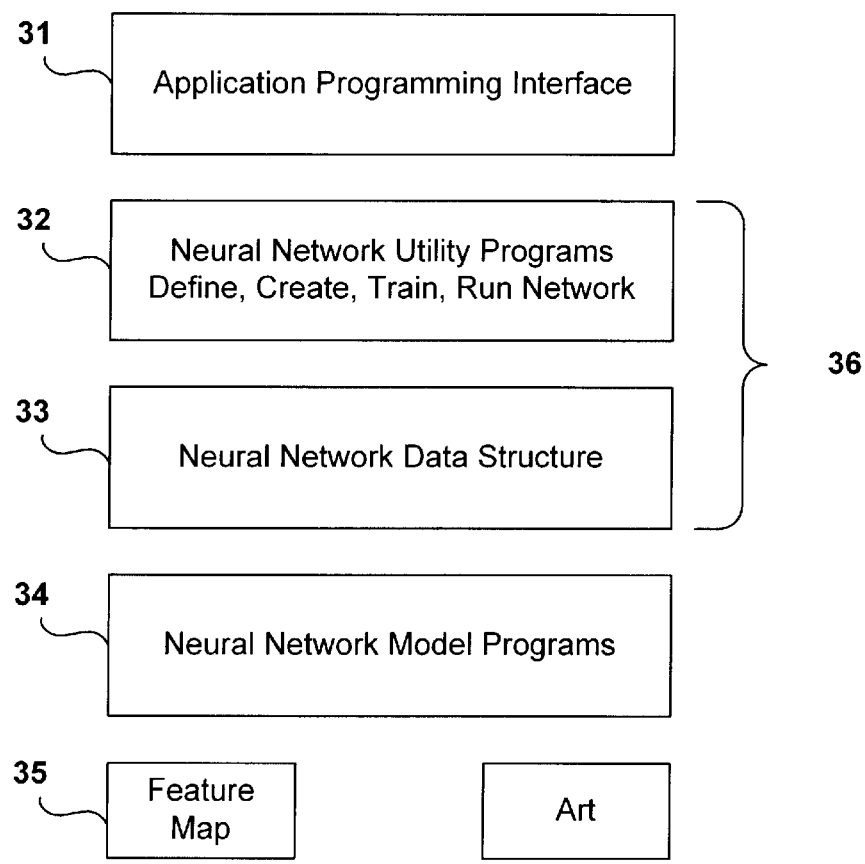
FIG. 11 is a conceptual framework for the Neural Network Application

FIG. 11 shows the components of the programming environment of the neural network programs and data. At the higher level of this conceptual layout is the application programming interface (API) (31) to the neural network programs and data. The API, which is not part of the invention, allows the application developers lacking expert knowledge of neural networks to access and use the 'utility programs' (32) in their application. The 'utility programs' allows users to define, create, train and run neural networks applications. The neural networks needs a data structure (33) to have a representation of the data which will be given as input to teach or to run the neural network. In the preferred embodiment the data structure should represent the IP addresses of the network devices in a format understandable by the neural network; the 'utility programs' form, with the 'data structure' the so called neural network shell. Using the neural network shell, one can create a neural network model by defining a generic neural network data structure which can be accessed by the utility programs. The model could be a Feature MAP (SOFM) or an ART.

Figure 12:
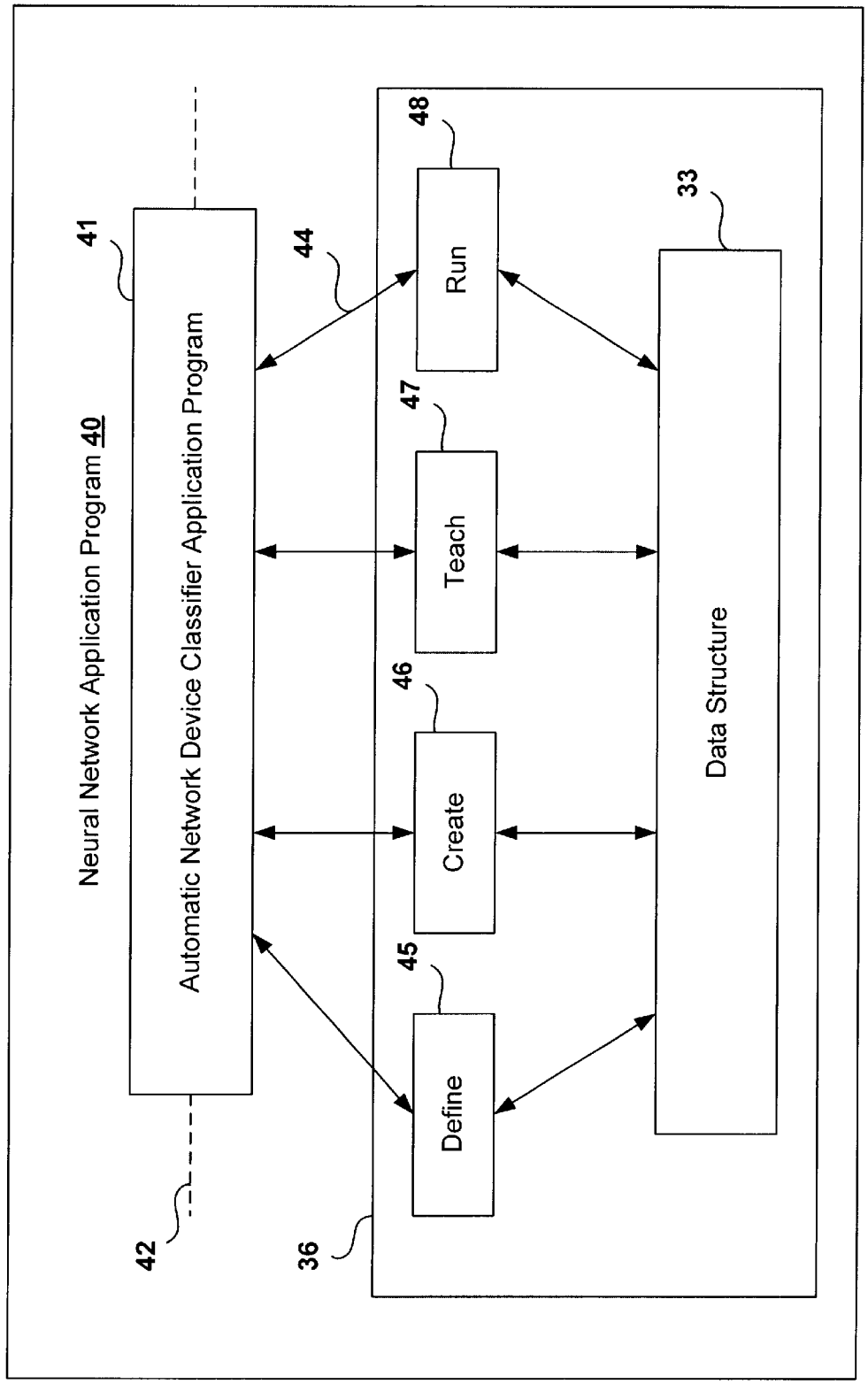
FIG. 12 illustrate the conceptual framework of the Neural Network classifier software

FIG. 12 shows that the Automatic Network Device Classifier software application of the preferred embodiment has become a neural network application program (40) so called because it uses the services of a neural network shell. The Automatic Network Device Classifier software application of the preferred embodiment receives results from the shell 36 and more particularly on path 44, it receives the output of the 'run' utility program of that shell. The other utility programs used by the Automatic Network Device Classifier software application are the define (45), create (46) and teach (47) neural network utility programs; as previously explained with the conceptual framework of FIG. 11, the utility programs themselves interface the data structure (33) of the neural network. The input 42 illustrates the other services and inputs to the Automatic Network Device Classifier software application such as the data formatters.

Figure 13:
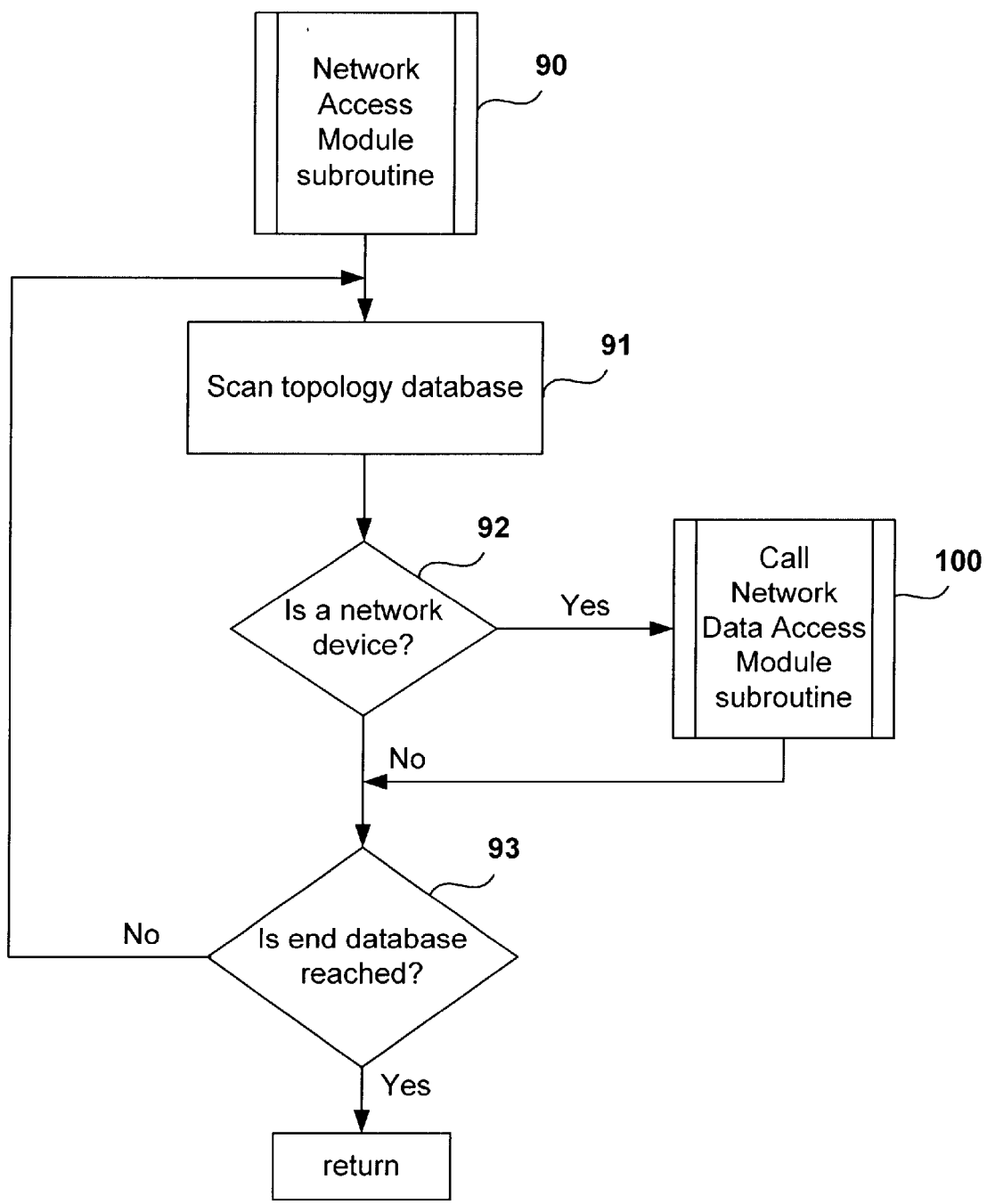
FIG. 13 is the flowchart of the Network Access Module subroutine
Figure 14:
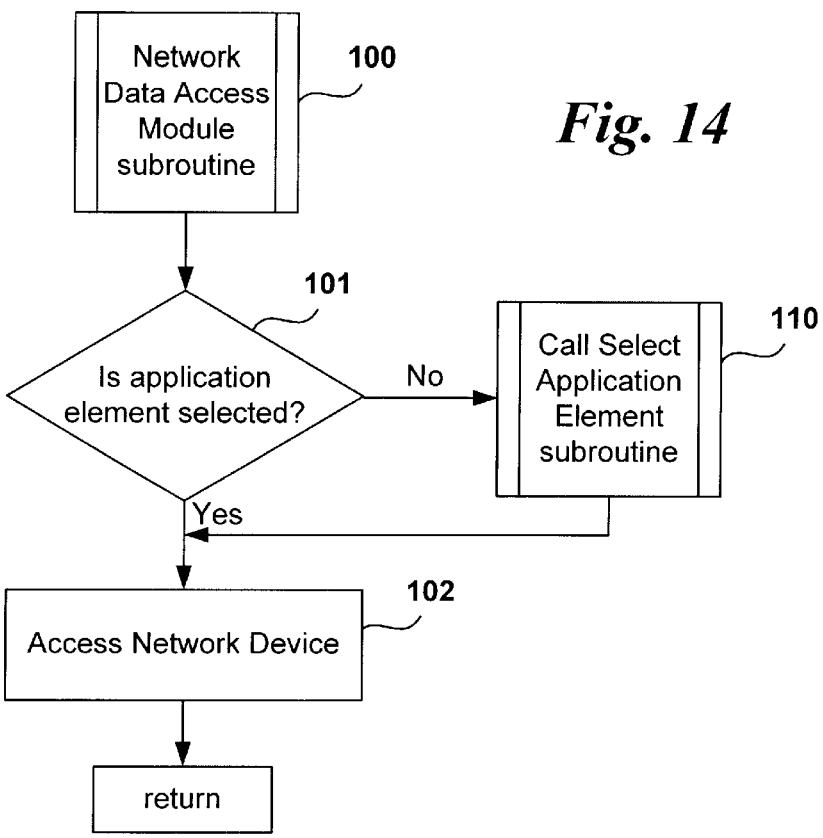
FIG. 14 is the flow chart of the Network Data Access Module subroutine.
Figure 15:
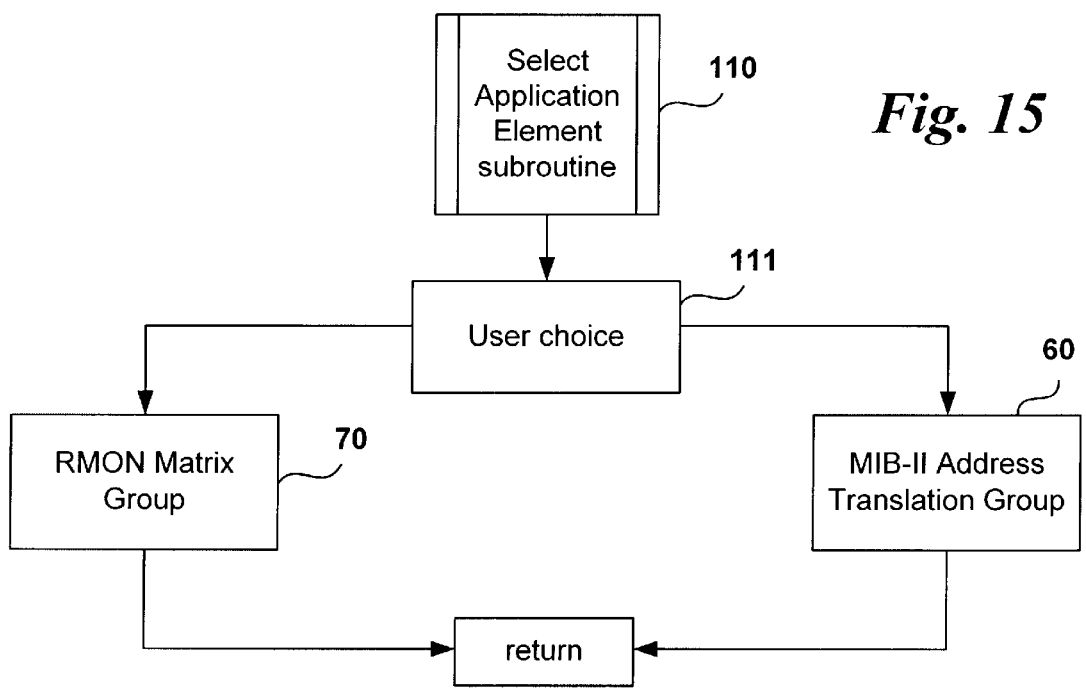
FIG. 15 is the flow chart of the Select Application Element subroutine.

The Network Access Module Subroutine (90) called in FIG. 2 and described in FIGS. 13, 14, 15 relates to the acquisition of input network data to feed the neural network, these data being the basis for VLAN classification. The input network data chosen in the preferred embodiment reflects the activity existing between the different network elements (device or application running on a device) . The network data are stored in the ARP (address resolution protocol) tables stored in the switches of the network and updated by these switches. These tables store for each network element the logical address and the physical address of the other network elements the network element communicates with.

The physical address of an application running on a network device is the physical address of the network device. The physical address depends on the protocol. In the case of a TCP/IP LANs, the logical address is the IP address and the physical address is the MAC address. Practically, this ARP table information will be retrieved for each network device in the SNMP MIB variables (FIG. 16) or the RMON matrix group (FIG. 17). These MIBs are stored on the network devices and updated periodically. The RMON matrix group is a specific MIB that some SNMP agents may maintain.

Referring now to FIGS. 13, 14 and 15 the acquisition of network data performed by the Network Access Module Subroutine (90) starts with the acquisition of all the IP addresses of the network devices obtained by scanning (91) of the topology data base. In the preferred embodiment, the topology data base is a flat file filled by the discovery process of NetView/6000, a network management platform operating on RS/6000 workstations. In the flat file, some records comprise the IP network device information which is the IP address field and other fields which are outside of the scope of the invention. If the record read in the topology data base flat file corresponds to a network device (92), the logical address is to be read. The user can choose the type of management information which will be read for this network device. In the preferred embodiment, if the type of management information has not been defined (101) the user is asked (111) to provide his choice. As stated sooner, it will be either the RMON matrix group (70) or the MIB Address Translation group. Once the choice decided, the information is read on the network device using the standard command of network management (102). This reading is performed until the end of the flat file is reached (93).

Figure 16:
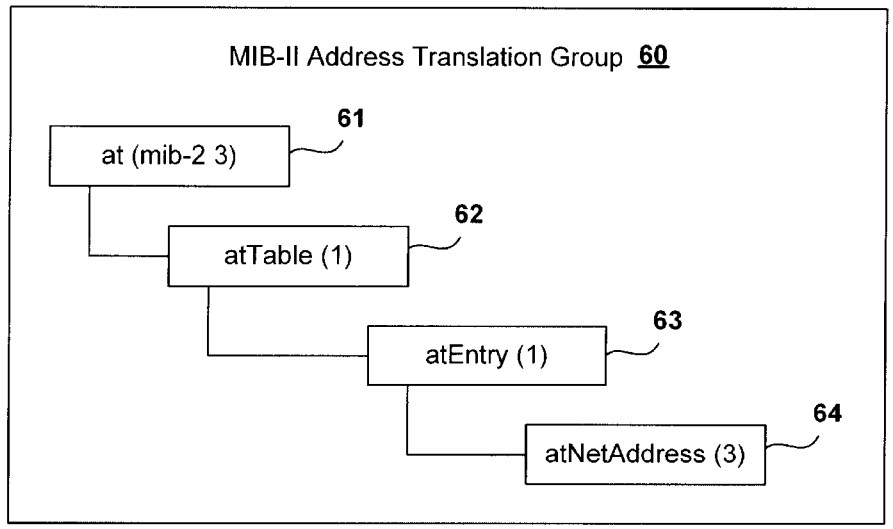
FIG. 16 illustrates the MIB II Address translation group of variables.
Figure 17:
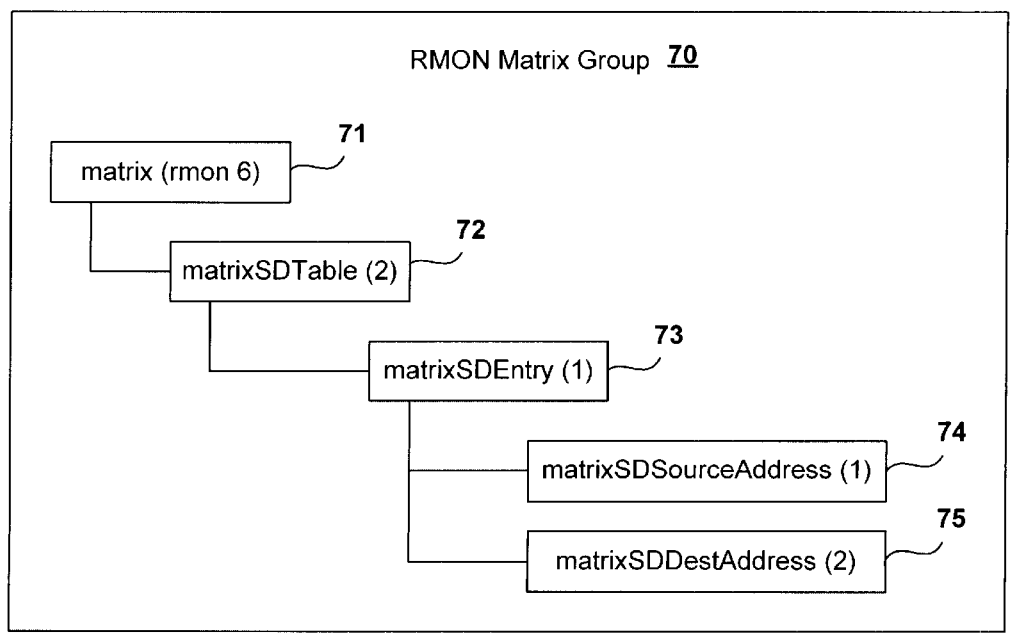
FIG. 17 illustrates the RMON matrix group of variables

FIG. 16 illustrates the MIB II Address TranslationGroup (60). It consists in a single table at(61). Each row in the table corresponds to one physical interface of the network device. The row corresponds to the mapping of the logical network address to the physical address. The atTable (62) contains the NetAddress to physical address equivalent. The atEntry (63) represents the fact that each entry contains one NetAddress to physical address equivalence. The atNetAddress (64) corresponds to the media-dependent physical address.

FIG. 17 illustrates the RMON Matrix Group (70) used alternatively to the MIB II Address Translation Group. The RMON Matrix Group is used to retrieve information about the traffic between pairs of hosts in a network. The RMON Matrix Group table (71) which is of interest for the invention is the matrix SD-Table (72). The matrixSD-Table is used to retrieve the statistics on traffic from a particular source host to a number of destinations.

The matrixSDSource Address (74) represents the destination MAC address.

Figure 18:
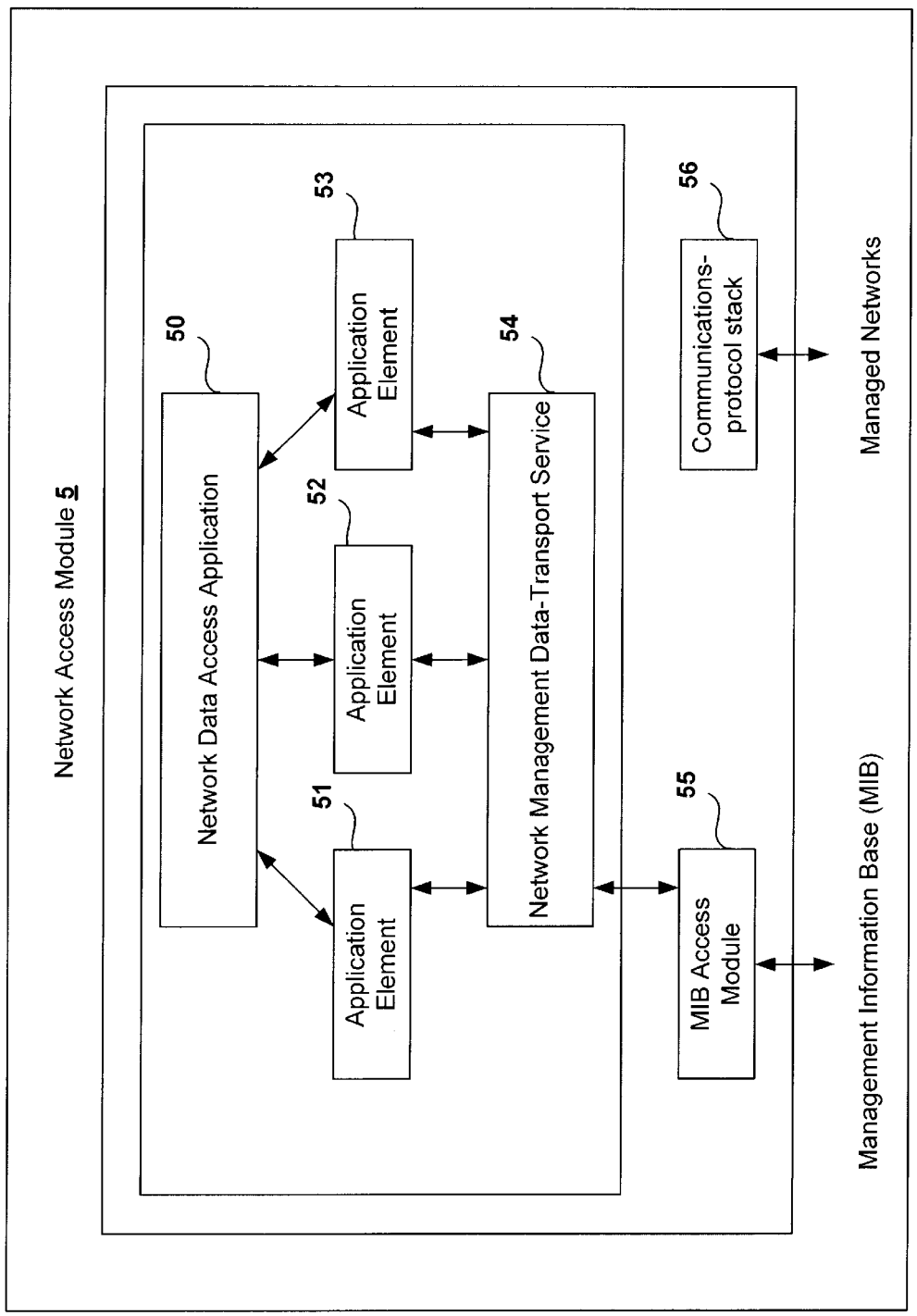
FIG. 18 illustrates the Network Architectural model.

FIG. 18 shows a software architectural model for the Network Access Module (5) corresponding to the subroutine (90) previously described in FIGS. 13, 14, 15. This software is based on SNMP. The Network Access module is organized in three layers. The top layer consists of the Network Data Access application (50) corresponding to the Network Data Access subroutine (100) previously described in FIGS. 14 and 15, which provides collection of data services. In the preferred embodiment, this part of the application corresponds to a data collection interface. Each application element (51–53) implements a specific basic access to a specific group of MIB variables. The lowest level is a network management data transport service (54). This module consists of a network management protocol to exchange network management information and a service interface to the application elements (51–53). In the preferred embodiment, the service interface provides two primitive functions, 'get single information' and 'get multiple information'. The Network Access Module accesses the local MIBs on the network devices. The MIB Access module (55) includes basic file management software that enables access to the MIB. In addition, the MIB Access module converts from the local MIB format to a form that is understandable by the other parts of the Network Access module. Communications with network devices are supported by a Communication-protocol stack (56) which is, in the preferred embodiment, TCP/IP.

Figure 19:
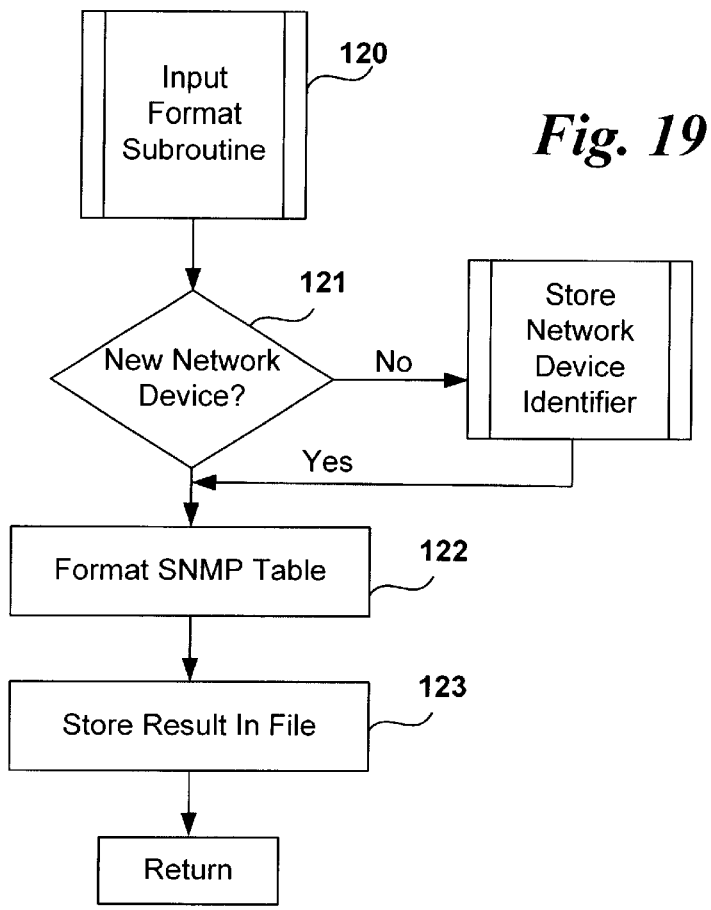
FIG. 19 is the flow chart of the Input Format subroutine.

Coming back to FIG. 2 illustrating the general flowchart of the preferred embodiment method of the invention, the Input Format Subroutine is called (120) before any starting of the classification. As a matter of fact, this step is necessary because of the use of neural network. FIG. 19 shows how the information retrieved from the network devices is formatted before being fed into the neural network. A test (121) is performed to check if the information comes from a new network device . If not, that means that the reference of the network device is already known and does not need to be registered. If the network device is not known, the identifier of network device is stored to be processed later. For any new network device, the SNMP table is retrieved and its content is formatted (122). Once done, the result is stored in a file for further processing (123).

Figure 20:
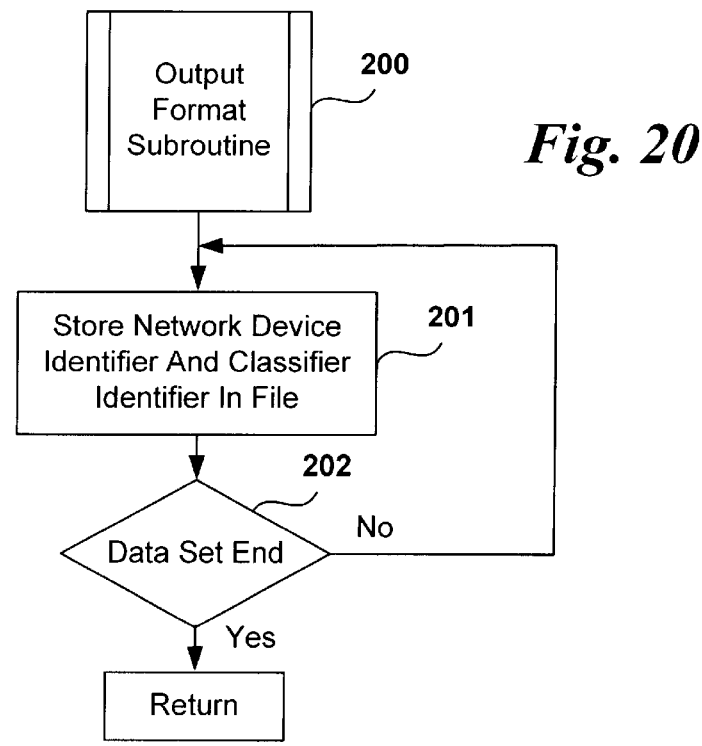
FIG. 20 is the flow chart of the Output Format subroutine.

FIG. 20 illustrates the Output Format subroutine (200) flowchart of the general flowchart in FIG. 2. In this subroutine, the data previously stored in a file is formatted. The network identifier is stored (201) in a readable format with a VLAN identifier which is the index of the output result of the neural network. This operation is performed for each data contained in the input file (202).

Figure 21:
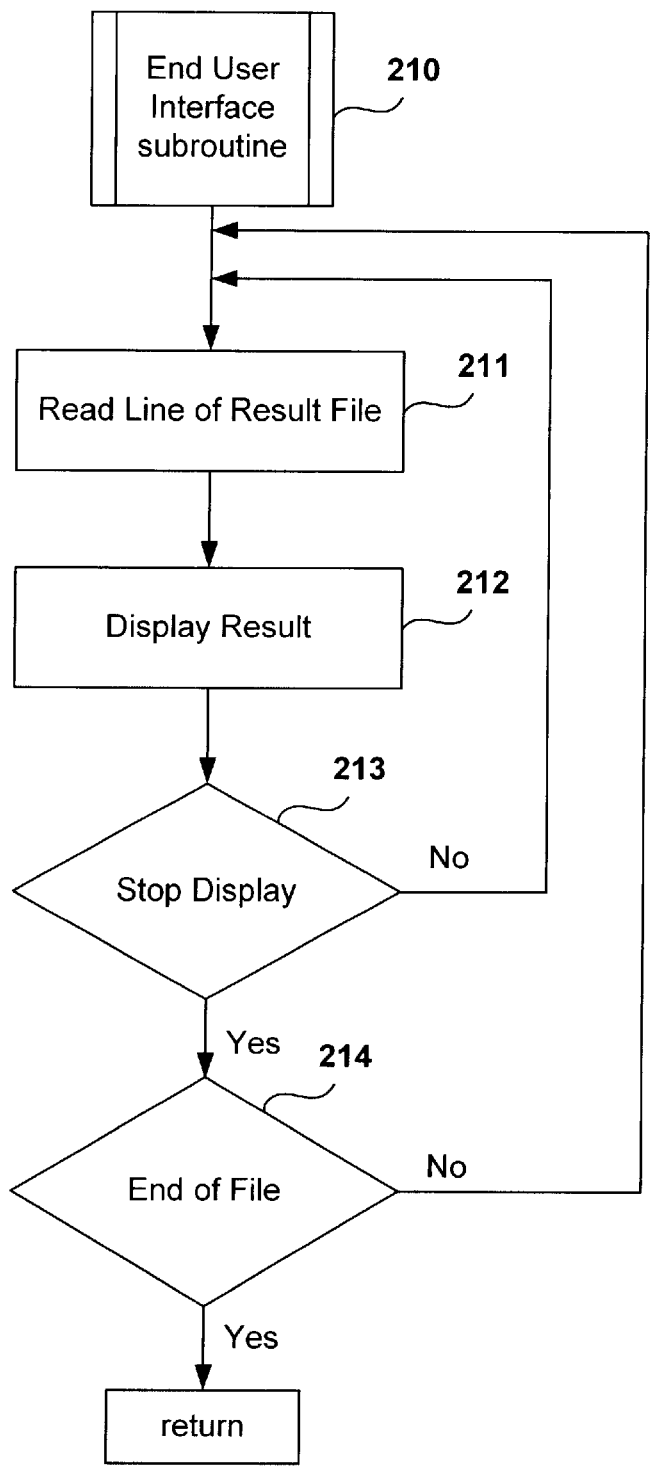
FIG. 21 is the flow chart of the End user Interface subroutine.

Finally, FIG. 21 provides the flowchart of the End User Interface subroutine (210) called at the end of the flowchart of FIG. 2. This subroutine allows the user to exploit the resulting result file of the operations of classifications previously performed in the previous steps. A line of the result file is read (211) and, according to the way the user wants the data to be presented, the data is displayed (212). At any time the user can stop displaying data (213). The subroutine ends once the end of the result file is reached (214). It is noted that the preferred embodiment is oriented to an interactive application with the user who is the network administrator accessing the network management workstation. With the automatic classification of the invention, the network administrator may decide to have this operation done automatically and periodically without the user interface. Furthermore, one can decide not to use the user interface for reading the list displayed or logged in the computer, but rather have the result of classification provided as input to a program which will take the result and, still using the network management services (if SNMP, using the SNMP GET command etc . . . ), will automatically update the VLAN definition in the switches of the network.

What is claimed is:

1. A method for classifying network devices into VLANs at switches in a switched network having a network management application managing said network devices, said method being characterized in that it comprises the steps of:

collecting network logical addresses and communication activity therebetween, stored on said network devices using said network management applications;

applying the collected network logical addresses and communication activity therebetween to a neural network operating on a computer, and running said neural network, to produce an output list of network devices grouped in VLANs according to the pattern presented by the network logical addresses communicating together, and sending the VLAN groupings from said computer to the switches.

2. The method of claim 1 characterized in that the neural network is a Self-Organizing Feature Map (SOFM) Artificial neural network.

3. The method of claim 2 characterized in that the network is TCP/IP network and the network logical addresses are the IP addresses of the other network devices which are communicating with said network devices.

4. The method of claim 3 further comprising the step of reading said output list of network devices grouped in VLANs and updating the network devices using this information with said list of network devices grouped in VLANs.

5. The method of claim 3 characterized in that the said network management application supports the single Network Management Protocol (SNMP).

6. The method of claim 5 characterized in that the IP addresses of the other network devices which are communicating with said network devices are obtained by said network management application reading a MIB stored in said network devices.

7. The method of claim 6 further comprising the step of reading said output list of network devices grouped in VLANs and updating the network devices using this information with said list of network devices grouped in VLANs, using said network management application.

8. The method of claim 5 characterized in that the IP addresses of the other network devices which are communicating with said network devices are obtained by said network management application reading a RMON Matrix Group stored in said network devices.

9. The method of claim 8 further comprising the step of reading said output list of network devices grouped in VLANs and updating the network devices using this information with said list of network devices grouped in VLANs, using said network management application.

10. The method of claim 2 further comprising the step of reading said output list of network devices grouped in VLANs and updating the network devices using this information with said list of network devices grouped in VLANs.

11. The method of claim 1 characterized in that the neural network is an Adaptive Resonance Theory (ART) Artificial neural network.

12. The method of claim 11 characterized in that the network is TCP/IP network and the network logical addresses are the IP addresses of the other network devices which are communicating with said network devices.

13. The method of claim 12 further comprising the step of reading said output list of network devices grouped in VLANs and updating the network devices using this information with said list of network devices grouped in VLANs.

14. The method of claim 12 characterized in that said network management application supports the Single Network Management Protocol (SNMP).

15. The method of claim 14 characterized in that the IP addresses of the other network devices which are communicating with said network devices are obtained by said network management application reading a MIB stored in said network devices.

16. The method of claim 15 further comprising the step of reading said output list of network devices grouped in VLANs and updating the network devices using this information with said list of network devices grouped in VLANs, using said network management application.

17. The method of claim 14 characterized in that the IP addresses of the other network devices which are communicating with said network devices are obtained by said network management application reading a RMON Matrix Group stored in said network devices.

18. The method of claim 17 further comprising the step of reading said output list of network devices grouped in VLANs and updating the network devices using this information with said list of network devices grouped in VLANs, using said network management application.

19. The method of claim 11 further comprising the step of reading said output list of network devices grouped in VLANs and updating the network devices using this information with said list of network devices grouped in VLANS.

20. A method according to claim 1 wherein the step of collecting communication activity includes a step of selectively discarding communication activity according to age.

21. A system for classifying network devices in VLANs at switches in a network comprising:

a main processor, a storage unit accessed by said main processor, a network interface to the network devices allowing collection of network logical addresses and communication traffic of said network devices by the main processor and storage of the collection in said storage unit, a neural network component activated by the main processor and fed by the main processor with said network logical addresses and communication traffic stored in said storage unit, said neural network providing an output list of VLANs classified according to the network logical addresses communicating together, said output list being stored in the storage unit by the main processor and sent to the switches of the network.

22. The system of claim 21 further comprising a user interface with said main processor allowing users to request VLAN classification to be activated, said user interface accessing also said output list of classified VLANs stored in said storage unit.

23. The system of claim 21 further comprising a network management component providing said network interface to said network devices, said network management component using the main processor for collecting network information and for updating the network devices with said output list of classified VLANs.

24. An article of manufacture comprising a computer usable medium having a computer program embedded in said medium, wherein the computer readable program when executed on a computer connected to a network including network devices switched by one or more LAN switches, causes the computer to:

collect, from the network devices, network logical addresses and intercommunication activity records stored on said network devices;

create an emulation of a neural network;

apply the collected network logical addresses and intercommunication records to the neural network emulation;

run the neural network emulation to produce an output list of network devices grouped in VLANs according to the pattern of the network logical addresses communicating together, and send the list to the LAN switches.

25. The article of manufacture of claim 24 wherein said emulation of a neural network is an emulation of a Self-Organizing Feature Map (SOFM) Artificial neural network.

26. The article of manufacture of claim 24 wherein said emulation of a neural network is an emulation of an Adaptive Resonance Theory (ART) Artificial neural network.

* * * * *